United States Patent
Yun

(10) Patent No.: US 9,954,204 B2
(45) Date of Patent: Apr. 24, 2018

(54) CURVED SECONDARY BATTERY

(71) Applicant: SAMSUNG SDI CO., LTD., Yongin-si, Gyeonggi-do (KR)

(72) Inventor: Young-Kwang Yun, Yongin-si (KR)

(73) Assignee: SAMSUNG SDI CO., LTD., Yongin-si, Gyeonggi-do (KR)

(*) Notice: Subject to any disclaimer, the term of this patent is extended or adjusted under 35 U.S.C. 154(b) by 252 days.

(21) Appl. No.: 14/602,484

(22) Filed: Jan. 22, 2015

(65) Prior Publication Data

US 2015/0303413 A1 Oct. 22, 2015

(30) Foreign Application Priority Data

Apr. 16, 2014 (KR) .................. 10-2014-0045358

(51) Int. Cl.
| | |
|---|---|
| *H01M 2/04* | (2006.01) |
| *H01M 2/02* | (2006.01) |
| *H01M 2/08* | (2006.01) |
| *H01M 10/058* | (2010.01) |
| *H01M 10/052* | (2010.01) |
| *H01M 10/0587* | (2010.01) |

(52) U.S. Cl.
CPC ....... *H01M 2/0408* (2013.01); *H01M 2/0202* (2013.01); *H01M 2/0275* (2013.01); *H01M 2/0287* (2013.01); *H01M 10/052* (2013.01); *H01M 10/058* (2013.01); *H01M 10/0587* (2013.01); *H01M 2002/0205* (2013.01)

(58) Field of Classification Search
CPC ............. H01M 2/0404; H01M 2/0456; H01M 2/0217; H01M 2/08
See application file for complete search history.

(56) References Cited

U.S. PATENT DOCUMENTS

| | | | |
|---|---|---|---|
| 6,020,086 A | | 2/2000 | Lerberghe |
| 2009/0023058 A1 | | 1/2009 | Kim |
| 2010/0003594 A1 | | 1/2010 | Hong et al. |
| 2013/0108907 A1 | | 5/2013 | Bhardwaj et al. |

FOREIGN PATENT DOCUMENTS

| | | | | |
|---|---|---|---|---|
| JP | 2001-325925 | * | 11/2001 | ............ H01M 2/10 |
| JP | 2002-170538 | * | 6/2002 | ............ H01M 2/10 |
| KR | 10-2005-0000725 A | | 1/2005 | |
| KR | 10-0876254 | | 12/2008 | |
| KR | 10-2010-0003557 | | 1/2010 | |

* cited by examiner

*Primary Examiner* — Osei K Amponsah
(74) *Attorney, Agent, or Firm* — Lee & Morse, P.C.

(57) ABSTRACT

A curved secondary battery including an electrode assembly having a curved shape, and a pouch sealing the electrode assembly. The pouch includes a first sealing sheet on a first surface of the electrode assembly, a second sealing sheet on a second surface of the electrode assembly, the first sealing sheet and the second sealing sheet sealing the electrode assembly, and a wing portion formed on a side of the electrode assembly by bound-together edges of the first sealing sheet and the second sealing sheet. The wing portion includes a body portion bent in a first direction and a reinforcement portion that is continuous with the body portion and is bent in a second direction to overlap the body portion. The second direction may be opposite to the first direction.

20 Claims, 4 Drawing Sheets

CURVED SECONDARY BATTERY

CROSS-REFERENCE TO RELATED APPLICATION

Korean Patent Application No. 10-2014-0045358, filed on Apr. 16, 2014, in the Korean Intellectual Property Office, and entitled: "Curved Secondary Battery," is incorporated by reference herein in its entirety.

BACKGROUND

1. Field

One or more embodiments relate to curved secondary batteries.

2. Description of the Related Art

Unlike primary batteries that cannot be charged, secondary batteries may be used after repetitive charging and discharging, and thus, they are economical and environmentally friendly. As such, use of secondary batteries has been strongly encouraged. Meanwhile, secondary batteries have started to be used in a variety of electronic devices and the design of such devices is considered to be an important factor when purchasing them.

For example, various wearable computer devices that use secondary batteries as power sources and applications of such devices have been developed and introduced on the market. Furthermore, many electronic devices such as cell phones and notebook computers are nowadays designed using ergonomics factors to include different curved areas. Thus, it is desirable for secondary batteries for operating such electronic devices to have shapes matching the shapes of the electronic devices.

SUMMARY

Embodiments are directed to a curved secondary battery including an electrode assembly having a curved shape, and a pouch sealing the electrode assembly. The pouch includes a first sealing sheet on a first surface of the electrode assembly, a second sealing sheet on a second surface of the electrode assembly, the first sealing sheet and the second sealing sheet sealing the electrode assembly, and a wing portion formed on a side of the electrode assembly by bound-together edges of the first sealing sheet and the second sealing sheet. The wing portion includes a body portion bent in a first direction and a reinforcement portion that is continuous with the body portion and is bent in a second direction to overlap the body portion. The second direction may be opposite to the first direction.

The reinforcement portion may be between the body portion and the side of the electrode assembly.

An overlapping area between the body portion and the reinforcement portion in a middle portion of the curved secondary battery may be different from an overlapping area between the body portion and the reinforcement portion in an outer portion of the curved secondary battery.

An area of the reinforcement portion overlapping the body portion in the middle portion of the curved secondary battery may be smaller than an area of the reinforcement portion overlapping the body portion in the outer portion of the curved secondary battery.

A width of the reinforcement portion in the middle portion of the curved secondary battery may be narrower than a width of the reinforcement portion in the outer portion of the curved secondary battery.

A width of the reinforcement portion may increase from the middle portion of the curved secondary battery to the outer portion of the curved secondary battery.

The width of the reinforcement portion may increase continuously.

The reinforcement portion may have a curved shape having a uniform curvature such that the width of the reinforcement portion increases in size from the middle portion of the curved secondary battery to the outer portion of the curved secondary battery.

The reinforcement portion may have a step with a width in the outer portion of the curved secondary battery being greater than a width in the middle portion of the curved secondary battery.

The reinforcement portion may include a plurality of steps formed in a step-wise manner. The width of the reinforcement portion may increase from the middle portion of the curved secondary battery to the outer portion of the curved secondary battery.

The wing portion may include an additional reinforcement portion that is continuous with the reinforcement portion and bent in the first direction. The additional reinforcement portion may be between the reinforcement portion and the body portion.

A width of the additional reinforcement portion in a middle portion of the curved secondary battery may be narrower than a width of the additional reinforcement portion in an outer portion of the curved secondary battery.

Embodiments are also directed to a curved secondary battery including an electrode assembly having a curved shape, and a pouch sealing the electrode assembly. The pouch includes a first sealing sheet on a first surface of the electrode assembly, a second sealing sheet on a second surface of the electrode assembly, the first sealing sheet and the second sealing sheet sealing the electrode assembly, and a wing portion formed on a side of the electrode assembly by binding an edge of the first sealing sheet to an edge of the second sealing sheet. The wing portion includes a body portion bent in a first direction, a first reinforcement portion that is continuous with the body portion and bent in a second direction, and a second reinforcement portion that is continuous with the first reinforcement portion and bent in the first direction to overlap the body portion.

The first reinforcement portion may be between the body portion and a side of the electrode assembly.

The second reinforcement portion may be between the body portion and the first reinforcement portion.

An overlapping area of the body portion and the reinforcement portion in a middle portion of the curved secondary battery may be different from an overlapping area of the body portion and the reinforcement portion in an outer portion of the curved secondary battery.

An area of the second reinforcement portion overlapping the body portion in a middle portion of the curved secondary battery may be smaller than an area of the second reinforcement portion overlapping the body portion in an outer portion of the curved secondary battery.

A width of the second reinforcement portion in the middle portion of the curved secondary battery may be narrower than a width of the second reinforcement portion in an outer portion of the curved secondary battery.

A width of the second reinforcement portion may increase from a middle portion of the curved secondary battery to an outer portion of the curved secondary battery.

The width of the second reinforcement portion may increase continuously.

The second reinforcement portion may have a curved shape having a uniform curvature such that the width of the second reinforcement portion increases from the middle portion of the curved secondary battery to the outer portion of the curved secondary battery.

BRIEF DESCRIPTION OF THE DRAWINGS

Features will become apparent to those of skill in the art by describing in detail exemplary embodiments with reference to the attached drawings in which.

These and/or other aspects will become apparent and more readily appreciated from the following description of the embodiments, taken in conjunction with the accompanying drawings in which.

DETAILED DESCRIPTION

Figure 1:
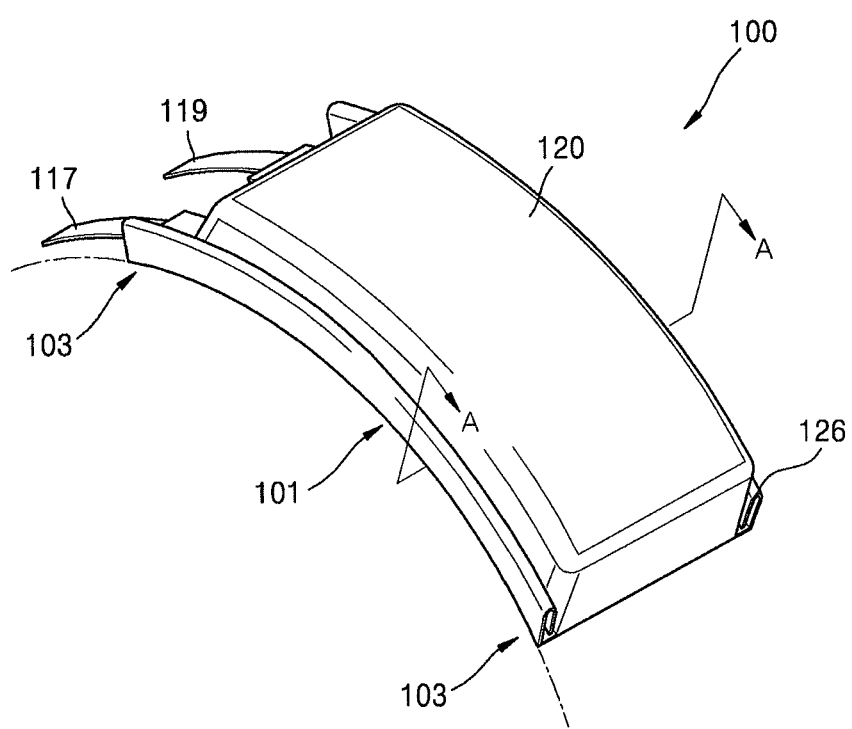
FIG. 1 illustrates a schematic perspective view of a curved secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

While terms such as "first", "second", etc., may be used to describe various components, such components are not limited by the above terms. The above terms are used only to distinguish one component from another.

Figure 2:
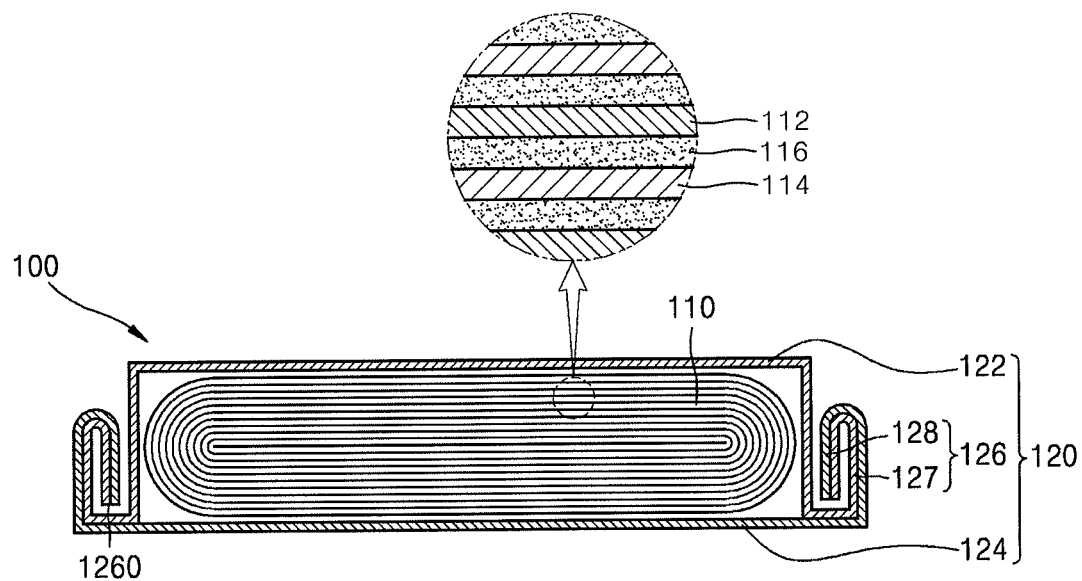
FIG. 2 illustrates a schematic cross-sectional view of a cross-section taken along line A-A in FIG. 1.

FIG. 1 illustrates a schematic perspective view of a curved secondary battery according to an embodiment. FIG. 2 illustrates a schematic cross-sectional view of a cross-section taken along line A-A in FIG. 1.

Referring to FIGS. 1 to 2, a curved secondary battery 100 according to an embodiment may include an electrode assembly 110 and a pouch 120 sealing the electrode assembly 110.

The electrode assembly 110 may include, for example, a laminate including a positive electrode plate 112 coated with a positive active material, a negative electrode plate 116 coated with a negative active material, and a separator 114 disposed between the positive electrode plate 112 and the negative electrode plate 116. The positive electrode plate 112 and the negative electrode plate 116 may be laminated on top of each other and then rolled into a jelly-roll shape. In other implementations, the electrode assembly 110 may include the positive electrode plate 112, the separator 114, and the negative electrode plate 116 sequentially laminated multiple times.

The positive electrode plate 112 may include a positive active material portion coated with a positive active material and a positive electrode non-coated portion that is not coated with a positive active material. The positive active material may be a lithium-containing transition metal oxide such as $LiCoO_2$, $LiNiO_2$, $LiMnO_2$, or $LiMnO_4$ or a lithium chalcogenide compound.

For example, the positive active material portion may be coated with a positive active material on at least some portions of one surface of an aluminum plate, and residual portions that are not coated with the positive active material may constitute a positive electrode non-coated portion.

The negative electrode plate 116 may include a negative active material portion coated with a negative active material and a negative electrode non-coated portion that is not coated with a negative active material. The negative active material may be a carbonaceous material such as crystalline carbon, non-crystalline carbon, carbon composite, and carbon fiber, a lithium metal, or a lithium alloy.

For example, the negative active material portion may be coated with a negative active material on at least some portions of one portion of a copper plate, and the negative electrode non-coated portion may correspond to residual portions of the copper plate that are not coated with the negative active material.

The separator 114 may be prepared, for example, by coating a substrate selected from the group of a copolymer of polyethylene (PE), polystyrene (PS), polypropylene (PP) and polyethylene (PE), and polypropylene (PP) with a polyvinylidene fluoride-hexafluoropropylene copolymer (PVDF-HFP co-polymer).

A first electrode tab 117 and a second electrode tab 119 may be attached to the electrode assembly 110. The first electrode tab 117 and the second electrode tab 119 may be respectively attached to the positive electrode non-coated portion and the negative electrode non-coated portion. The first electrode tab 117 and the second electrode tab 119 may pass through the pouch 120, which seals the electrode assembly 110, to be exposed externally.

The curved secondary battery 100 may be a secondary battery having a curvature obtained by pressing a flat secondary battery. The electrode assembly 110 may have a curved shape due to this pressing process.

The pouch 120 may include a first sealing sheet 122 disposed on a first surface of the electrode assembly 110, a second sealing sheet 124 formed on a second surface of the electrode assembly 110, and a wing portion 126. For example, the second surface may be a surface opposite the first surface.

The first sealing sheet 122 and the second sealing sheet 124 may have, for example, a triple-layered structure including an insulating layer, a metal layer, and an insulating layer. For example, the metal layer may be formed of aluminum, steel, stainless steel, or the like, and the insulating layer may be formed of modified polypropylene (CPP), polyethylene terephthalate (PET), nylon, or the like.

One side of the first sealing sheet 122 and one side of the second sealing sheet 124 may be continuously formed. A housing space may be formed in the second sealing sheet 124 for housing the electrode assembly 110. When the electrode assembly 110 is housed in the housing space, the first sealing sheet 122 continuously formed with one side of the second sealing sheet 124 may be folded on the second sealing sheet 124. In another implementation, a housing space may be formed in the first sealing sheet 122 for housing the electrode assembly 110. When the electrode assembly 110 is housed in the housing space, the second sealing sheet 124 continuously formed with one side of the first sealing sheet 122 may be folded on the first sealing sheet 122.

An edge portion of the first sealing sheet 122 and an edge portion of the second sealing sheet 124 contacting each other may be bonded together in the housing space.

The electrode assembly 110 may be sealed, and the edge portion in which the first sealing sheet 122 and the second sealing sheet 124 are bonded may have wing portions 126 on both ends of the electrode assembly 110.

The wing portion 126 may include, for example, a body portion 127 bent in a first direction and a reinforcement portion 128 that is continuously formed from the body portion 127 and bent in a second direction. The second direction may be a direction opposite to the first direction. The body portion 127 may be disposed on the outermost periphery of the curved secondary battery 100 and the reinforcement portion 128 may be disposed between the body portion 127 and a side of the electrode assembly 110.

As such, when the reinforcement portion 128 is disposed between the body portion 127 and a side of the electrode assembly 110, an end portion 1260 of the wing portion 126 may be prevented from being exposed externally. Metal layers of the first sealing sheet 122 and the second sealing sheet 124 in the end portion 1260 may be prevented from being exposed to external moisture, oxygen, or the like.

The body portion 127 and the reinforcement portion 128 may be continuously formed in the wing portion 126. If moisture or oxygen were to penetrate through the first sealing sheet 122 or the second sealing sheet 124 via the end portion 1260, the penetration pathway would be long. Accordingly, penetration of oxygen, moisture, or the like may be effectively blocked. In addition, use of an adhesion tape for insulation of the end portion 1260 of a comparative first sealing sheet 122 and second sealing sheet 124 may be omitted, thereby simplifying a manufacturing process of the curved secondary battery.

The body portion 127 may be bent in the first direction one time and the reinforcement portion 128 may be bent in the opposite direction (a second direction), such that the reinforcement portion 128 overlaps the body portion 127.

Herein, a middle portion of the curved secondary battery 100 in a length direction of the electrode assembly 110 (for example, parallel to the winding axis of the electrode assembly 110) is referred to as a middle portion 101. Both ends of the curved secondary battery in the length direction of the electrode assembly 110 are referred to as outer portions 103. In the curved secondary battery 100 according to the present embodiment, an overlapping area between the body portion 127 and the reinforcement portion 128 in the middle portion 101 may be different from the overlapping area in the outer portion 103. For example, an area of the reinforcement portion 128 overlapping the body portion 127 in the middle portion 101 may be smaller than an area of the reinforcement portion 128 overlapping with the body portion 127 in the outer portion 103.

Figure 3:
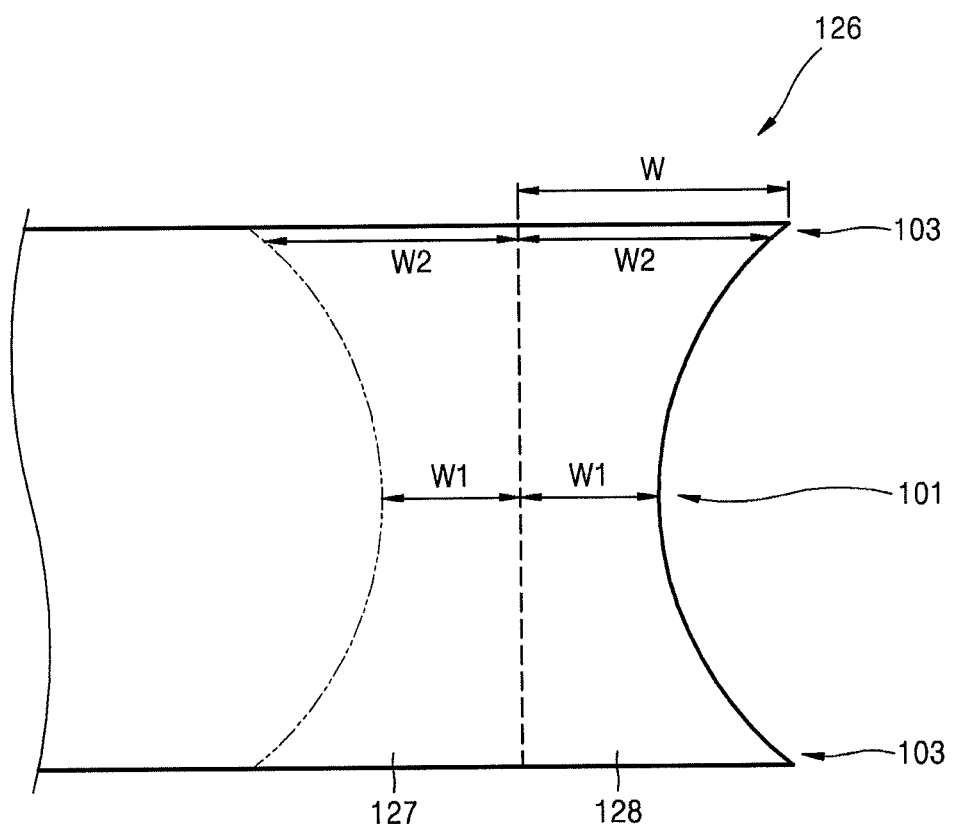
FIG. 3 illustrates a schematic plan view of an embodiment of a wing portion of the curved secondary battery in FIG. 1.

FIG. 3 is a schematic plan view of an embodiment of the wing portion 126 showing the middle portion 101 and end portions 103 of the curved secondary battery 100. In particular, FIG. 3 shows an unfolded state of the body portion 127 and the reinforcement portion 128 of the wing portion 126. In addition, the dotted lines in FIG. 3 illustrate a state in which the reinforcement portion 128 is bent in the second direction and overlaps with the body portion 127. Also, FIG. 3 illustrates a width W1 of the reinforcement portion 128 at the middle portion 101 and a width W2 of the reinforcement portion 128 at the outer portion 103.

Referring to FIG. 3, the area of the reinforcement portion 128 overlapping the body portion 127 in the middle portion 101 may be smaller than the area of the reinforcement portion 128 overlapping the body portion 127 in the outer portion 103. The width W1 of the reinforcement portion 128 that is perpendicular to a length direction of the electrode assembly 110 in the middle portion 101 may be smaller than the width W2 of the reinforcement portion 128 that is perpendicular to a length direction of the electrode assembly 110 in the outer portion 103.

As described above, the curved secondary battery 100 according to an embodiment may be formed by pressing a flat battery. In this regard, the middle portion of the curved secondary battery 100 may have the smallest radius of curvature and the edge portion of the curved secondary battery 100 may have the largest radius of curvature.

Accordingly, the greatest amount of pressure may be applied to the middle portion 101 of the curved secondary battery 100. When the area of the reinforcement portion 128 overlapping the body portion 127 is reduced, the curved secondary battery 100 may be formed more easily.

On the other hand, when the area of the reinforcement portion 128 overlapping the body portion 127 in the outer portion 103 is greater than the area in the middle portion 101, a structure of the curved secondary battery 100 may be maintained.

The wing portion 126 may be bent twice. Accordingly, a thickness of a side portion of the battery may increase compared with a case when the sealing portion is bent only once. As a result, stress applied to the flat battery to form the curved battery may be dispersed, and thus, the shape of the curved battery may be maintained more easily.

A width W of the reinforcement portion 128 may gradually increase from the middle portion 101 to the outer portion 103. For example, as illustrated in FIG. 3, the width W of the reinforcement portion 128 may continuously increase from the middle portion 101 to the outer portion 103.

According to an embodiment, the reinforcement portion 128 of the curved secondary battery 100 may have a curvature such that the width W of the reinforcement portion 128 increases from the middle portion 101 to the outer portion 103.

Figure 4:
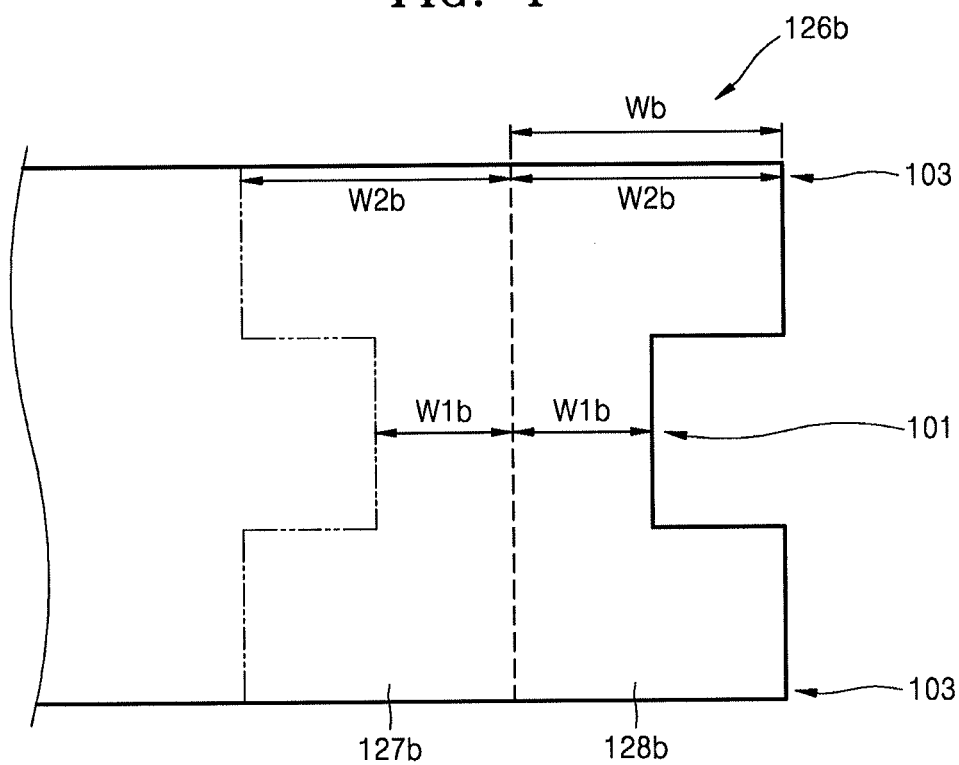
FIG. 4 illustrates a schematic plan view of another embodiment of a wing portion of the curved secondary battery in FIG. 1.
Figure 5:
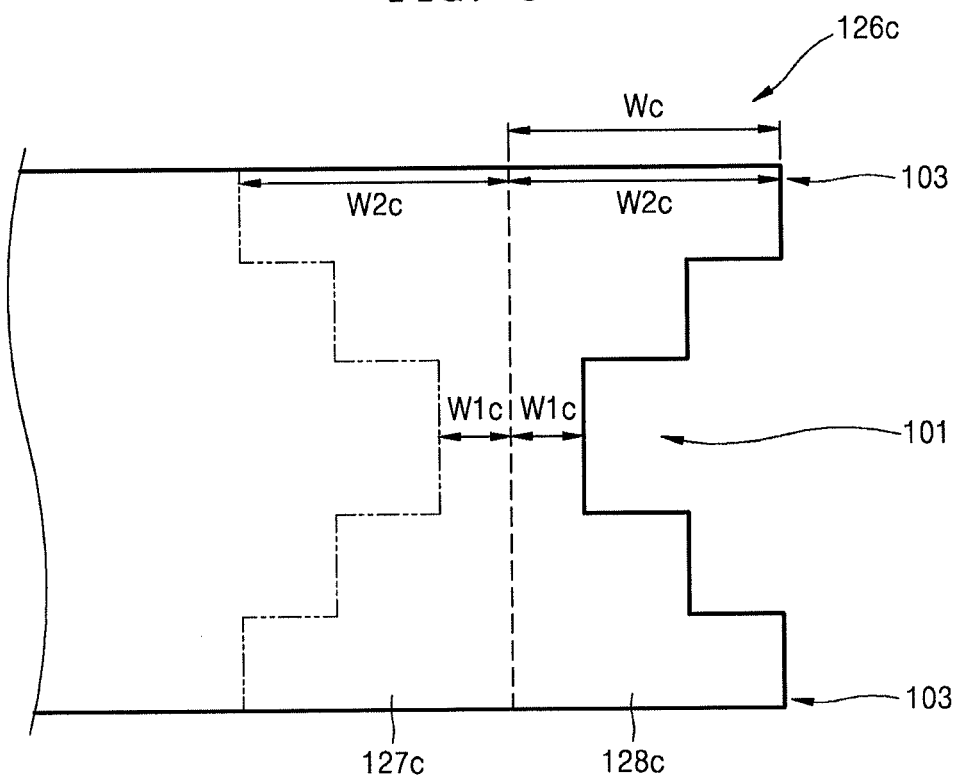
FIG. 5 illustrates a schematic plan view of another embodiment of a wing portion of the curved secondary battery in FIG. 1.

FIGS. 4 and 5 illustrate schematic plan views of other embodiments of the wing portion 126.

FIG. 4 illustrates, via full lines, unfolded states of a body portion 127b and a reinforcement portion 128b of a wing portion 126b. Also, FIG. 4 illustrates, via dotted lines, a state in which the reinforcement portion 128b is bent in a second direction.

Referring to FIG. 4, a width Wb of the reinforcement portion 128b may be greater in the outer portion 103 than in the middle portion 101. For example, the width of the body portion 127b may be uniform and the width Wb of the reinforcement portion 128b may form a step. A width W2b of the outer portion 103 may be greater than a width W1b of the middle portion 101.

The area of the reinforcement portion 128b overlapping the body portion 127b in the outer portion 103 may be relatively larger than the area of the reinforcement portion 128b overlapping the body portion 127b in the middle portion 101. Thus, the manufacturing efficiency of the curved secondary battery 100 in FIG. 1 may be improved, and the shape of the curved secondary battery 100 in FIG. 1 may be maintained.

FIG. 5 illustrates, via full lines, unfolded states of a body portion 127c and a reinforcement portion 128c of a wing portion 126c. FIG. 5 also shows, via dotted lines, a state in which the reinforcement portion 128c is bent in a second direction.

As in the wing portion 126b of FIG. 4, the wing portion 126c in FIG. 5 may have a width Wc in a reinforcement portion 128c, in which a width W2c in the outer portion 103 is greater than a width W1c in the middle portion 101. The manufacturing efficiency of the curved secondary battery 100 in FIG. 1 may be improved, and the shape of the curved secondary battery 100 in FIG. 1 may be maintained.

Referring to FIG. 5, the edge of the reinforcement portion 128c may form a plurality of steps such that the width Wc sequentially increases from the middle portion 101 to the outer portion 103. When moving from the middle portion 101 to the outer portion 103, the width Wc of the reinforcement portion 128c may be prevented from changing rapidly. Thus, when a flat battery is pressed to form the curved secondary battery 100, stress applied to the curved secondary battery 100 in FIG. 1 may be dispersed effectively.

Figure 6:
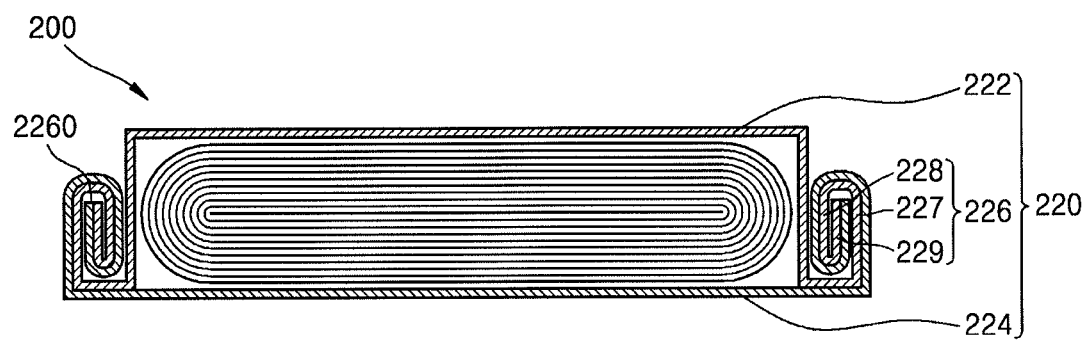
FIG. 6 illustrates a schematic perspective view of a curved secondary battery according to another embodiment.

FIG. 6 illustrates a schematic perspective view of the curved secondary battery 200 according to of another embodiment.

The curved secondary battery 200 may include an electrode assembly 210 having a curvature and a pouch 220 sealing the electrode assembly 210. The pouch 220 may include a first sealing sheet 222 disposed on a first surface of the electrode assembly 210, a second sealing sheet 224 sealing the electrode assembly 210 along with the first sealing sheet 222, and a wing portion 226 formed on a side of the electrode assembly 210 by binding an edge of the first sealing sheet 222 and an edge of the second sealing sheet 224.

The electrode assembly 210, the first sealing sheet 222, and the second sealing sheet 224 may be the same as the electrode assembly 110, the first sealing sheet 122, and the second sealing sheet 124 respectively described in FIG. 1 and FIG. 2.

The wing portion 226 may be formed by binding the edge first sealing sheet 222 and the edge of the second sealing sheet 224. The wing portion 226 may include a body portion 227 bent in a first direction, a first reinforcement portion 228 that is continuously formed with the body portion 227 and is bent in a second direction, and a second reinforcement portion 229 that is continuously formed with the first reinforcement portion 228 and is bent in the first direction to overlap with the body portion 227. The wing portion 226 may be bent three times.

The first direction and the second direction may be opposite to each other. As illustrated in FIG. 6, the first direction may be a topward direction and the second direction may be a direction opposite the first direction, that is, a bottomward direction.

The first reinforcement portion 228 may be bent to be disposed between the body portion 227 and a side of the electrode assembly 210. The second reinforcement portion 229 may be bent to be disposed between the first reinforcement portion 228 and the body portion 227.

When the second reinforcement portion 229 is disposed between the first reinforcement portion 228 and the body portion 227, external exposure of an end portion 2260, which may expose metal layers in the first sealing sheet 222 and the second sealing sheet 224, may be effectively prevented. The end portion 2260 may be disposed in the wing portion 226. Accordingly, exposure of the metal layer to external moisture or contamination may be prevented. In addition, a manufacturing process of attaching a tape to the end portion 2260 for insulation may be omitted. Thus, the manufacturing process of the curved secondary battery 100 in FIG. 1 may be simplified.

When the wing portion 226 is bent three times, the end portion 2260 may be disposed deeper in the wing portion 226. Accordingly, as the number of bending increases for the wing portion, even if external damaging factors such as water and air were penetrate through an end portion of the wing portion, the penetration pathway would be long. Thus, penetration may be effectively blocked to increase the insulation efficiency of the curved battery.

The wing portion 226 may be bent three times. Accordingly, a thickness of the wing portion 226 may be increased, and thus, a mechanical strength of the wing portion 226 may be increased. The shape of the curved secondary battery 100 of FIG. 1 may be more stably maintained.

In the middle portion and the outer portion of the curved secondary battery 200, overlapping areas between the body portion 227 and the second reinforcement portion 229 may be different. For example, the overlapping area in the middle portion may be smaller than the overlapping area in the outer portion.

An area of the second reinforcement portion 229 overlapping with the body portion 227 in the middle portion may be smaller than an area of the reinforcement portion 227 overlapping with the body portion 227 in the outer portion. A width of the second reinforcement portion 229 may continuously increase from the middle portion to the outer portion or may increase in a step-wise manner. As a result, manufacturing efficiency of the curved secondary battery 100 in FIG. 1 may be improved and the shape of the curved secondary battery 100 in FIG. 1 may be maintained.

As described above, according to the one or more of the above embodiments, the manufacturing efficiency of the curved secondary battery may improve.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A curved secondary battery, comprising:
   an electrode assembly being curved; and
   a pouch sealing the curved electrode assembly, wherein,
   the pouch includes a first sealing sheet on a first surface of the electrode assembly, a second sealing sheet on a second surface of the electrode assembly, the first sealing sheet and the second sealing sheet sealing the curved electrode assembly, and a wing portion formed on a side of the curved electrode assembly by bound-together edges of the first sealing sheet and the second sealing sheet, and the wing portion includes a body portion bent in a first direction and a reinforcement portion that is continuous with the body portion and is bent in a second direction to overlap the body portion, wherein the body portion and the reinforcement portion of the wing portion are curved along the side of the curved electrode assembly, and wherein:

an overlapping area between the body portion and the reinforcement portion in a middle portion of the curved electrode assembly is different from an overlapping area between the body portion and the reinforcement portion in an outer portion of the curved electrode assembly, and a curvature of the middle portion of the curved electrode assembly is different from than a curvature of the outer portion of the curved electrode assembly.

2. The curved secondary battery as claimed in claim 1, wherein the second direction is opposite to the first direction.

3. The curved secondary battery as claimed in claim 1, wherein the reinforcement portion is between the body portion and the side of the curved electrode assembly.

4. The curved secondary battery as claimed in claim 1, wherein:

the overlapping area between the reinforcement portion and the body portion in the middle portion of the curved electrode assembly is smaller than the overlapping area between the reinforcement portion and the body portion in the outer portion of the curved electrode assembly, and the curvature of the middle portion of the curved electrode assembly is greater than the curvature of the outer portion of the curved electrode assembly.

5. The curved secondary battery as claimed in claim 1, wherein:

a width of the reinforcement portion in the middle portion of the curved electrode assembly is narrower than a width of the reinforcement portion in the outer portion of the curved electrode assembly, and the curvature of the middle portion of the curved electrode assembly is greater than the curvature of the outer portion of the curved electrode assembly.

6. The curved secondary battery as claimed in claim 1, wherein:

a width of the reinforcement portion increases from the middle portion of the curved electrode assembly to the outer portion of the curved electrode assembly, and the curvature of the middle portion of the curved electrode assembly is greater than the curvature of the outer portion of the curved electrode assembly.

7. The curved secondary battery as claimed in claim 6, wherein the width of the reinforcement portion increases continuously.

8. The curved secondary battery as claimed in claim 7, wherein the reinforcement portion has a curved shape having a curvature that increases in size from the middle portion of the curved electrode assembly to the outer portion of the curved electrode assembly.

9. The curved secondary battery as claimed in claim 6, wherein the reinforcement portion has a step with a width in the outer portion of the curved electrode assembly being greater than a width in the middle portion of the curved electrode assembly.

10. The curved secondary battery as claimed in claim 9, wherein:

the reinforcement portion includes a plurality of steps formed in a step-wise manner, and the width of the reinforcement portion increases from the middle portion of the curved electrode assembly to the outer portion of the curved electrode assembly.

11. The curved secondary battery as claimed in claim 1, wherein:

the wing portion further includes an additional reinforcement portion that is continuous with the reinforcement portion and bent in the first direction, and the additional reinforcement portion is between the reinforcement portion and the body portion.

12. The curved secondary battery as claimed in claim 11, wherein a width of the additional reinforcement portion in the middle portion of the curved electrode assembly is narrower than a width of the additional reinforcement portion in the outer portion of the curved electrode assembly.

13. A curved secondary battery, comprising:

an electrode assembly being curved; and a pouch sealing the curved electrode assembly; wherein, the pouch includes a first sealing sheet on a first surface of the curved electrode assembly, a second sealing sheet on a second surface of the curved electrode assembly, the first sealing sheet and the second sealing sheet sealing the curved electrode assembly, and a wing portion formed on a side of the curved electrode assembly by binding an edge of the first sealing sheet to an edge of the second sealing sheet; and the wing portion includes a body portion bent in a first direction, a first reinforcement portion that is continuous with the body portion and bent in a second direction, and a second reinforcement portion that is continuous with the first reinforcement portion and bent in the first direction to overlap the body portion, wherein the body portion, the first reinforcement portion, and the second reinforcement portion of the wing portion are curved along the side of the curved electrode assembly, wherein:

an overlapping area of the body portion and the second reinforcement portion in a middle portion of the curved electrode assembly is different from an overlapping area of the body portion and the first reinforcement portion in an outer portion of the curved secondary battery, and a curvature of the middle portion of the curved electrode assembly is different from a curvature of the outer portion of the curved electrode assembly.

14. The curved secondary battery as claimed in claim 13, wherein the first reinforcement portion is between the body portion and a side of the curved electrode assembly.

15. The curved secondary battery as claimed in claim 13, wherein the second reinforcement portion is between the body portion and the first reinforcement portion.

16. The curved secondary battery as claimed in claim 13, wherein:

the overlapping area between the second reinforcement portion and the body portion in the middle portion of the curved electrode assembly is smaller than the overlapping area between the second reinforcement portion and the body portion in the outer portion of the curved electrode assembly, and the curvature of the middle portion of the curved electrode assembly is greater than the curvature of the outer portion of the curved electrode assembly.

17. The curved secondary battery as claimed in claim 13, wherein:

a width of the second reinforcement portion in the middle portion of the curved electrode assembly is narrower than a width of the second reinforcement portion in the outer portion of the curved electrode assembly, and the curvature of the middle portion of the curved electrode assembly is greater than the curvature of the outer portion of the curved electrode assembly.

18. The curved secondary battery as claimed in claim 13, wherein:

a width of the second reinforcement portion increases from the middle portion of the curved electrode assembly to the outer portion of the curved electrode assembly, and the curvature of the middle portion of the curved electrode assembly is greater than the curvature of the outer portion of the curved electrode assembly.

19. The curved secondary battery as claimed in claim 18, wherein the width of the second reinforcement portion increases continuously.

20. The curved secondary battery as claimed in claim 18, wherein second reinforcement portion has a curved shape having a curvature such that the width of the second reinforcement portion increases from the middle portion of the curved electrode assembly to the outer portion of the curved electrode assembly.

\* \* \* \* \*